United States Patent [19]

Glasgow

[11] 4,040,734
[45] * Aug. 9, 1977

[54] CRUST FORMER

[76] Inventor: Luther Ellis Glasgow, 2122 Lakeshore Ave., Oakland, Calif. 94606

[*] Notice: The portion of the term of this patent subsequent to Sept. 2, 1992, has been disclaimed.

[21] Appl. No.: 608,641

[22] Filed: Aug. 28, 1975

Related U.S. Application Data

[63] Continuation-in-part of Ser. No. 361,654, May 18, 1973, Pat. No. 3,902,837.

[51] Int. Cl.² ............................................. A47J 43/00
[52] U.S. Cl. .................................. 425/218; 425/267; 425/458
[58] Field of Search ................ 425/458, 87, 218, 267, 425/263, 469, 457; 164/163

[56] References Cited

U.S. PATENT DOCUMENTS

| | | | |
|---|---|---|---|
| 1,001,622 | 8/1911 | Crane | 425/263 |
| 1,028,549 | 6/1912 | Crossley | 425/263 |
| 1,472,229 | 10/1923 | Plempez | 425/218 |
| 1,902,047 | 3/1933 | Schantz | 425/218 |
| 3,307,502 | 3/1967 | Armour | 425/267 |
| 3,451,359 | 6/1969 | Glasgow | 425/263 |
| 3,734,674 | 5/1973 | Steele | 425/458 |
| 3,902,837 | 9/1975 | Glasgow | 425/458 |

FOREIGN PATENT DOCUMENTS

| | | | |
|---|---|---|---|
| 853,153 | 11/1960 | United Kingdom | 425/263 |

*Primary Examiner*—Francis S. Husar
*Assistant Examiner*—William R. Briggs
*Attorney, Agent, or Firm*—Flehr, Hohbach, Test, Albritton & Herbert

[57] ABSTRACT

A crust former for use with a wall-equipped container to construct crust therein from a mass of crust material provided within the container for this purpose. The crust former includes a forming head adapted to rotate about the center of such container to distribute the mass of crust material therein usually along both the bottom and side walls of the container to construct such crust. The head is carried by structure to positionally relate the forming head in a predetermined spatial relationship with the bottom and side walls of the container necessary for construction of the crust therealong. This structure enables the head and container to be relatively rotatable, and means are included in the crust former for preventing accumulation of crust material along the upper edge portion or rim of the container.

34 Claims, 21 Drawing Figures

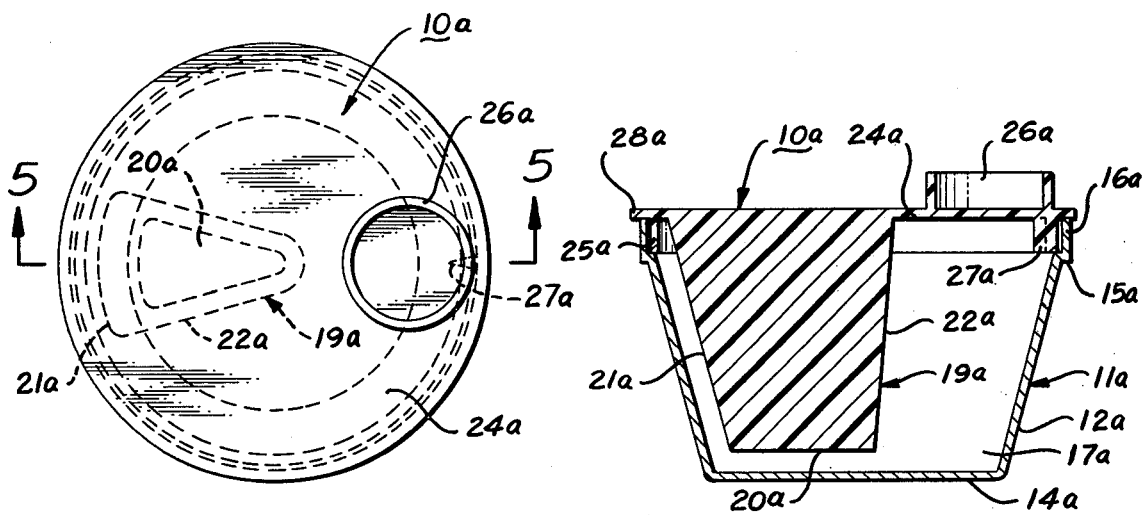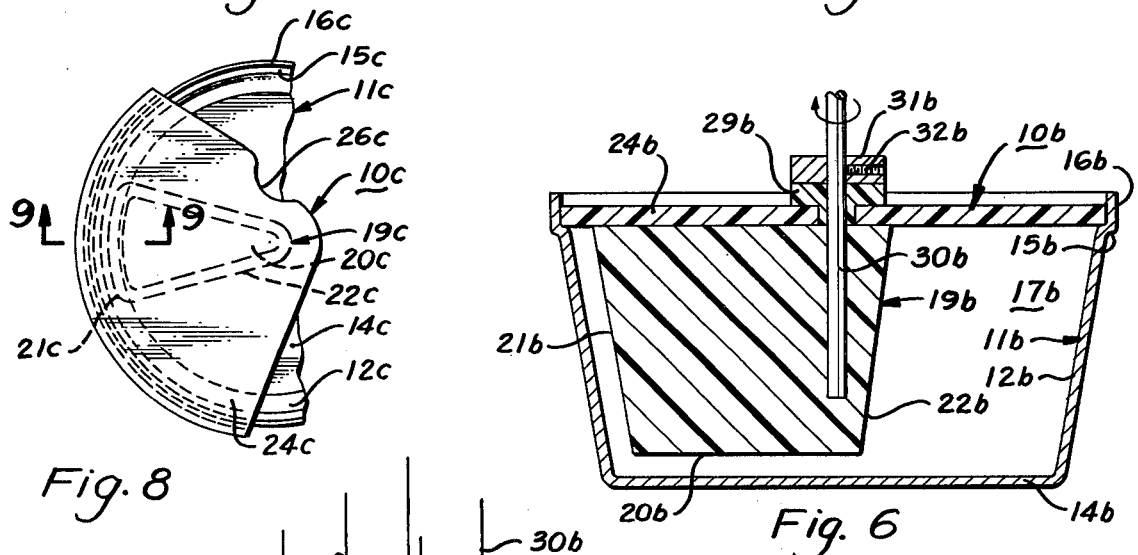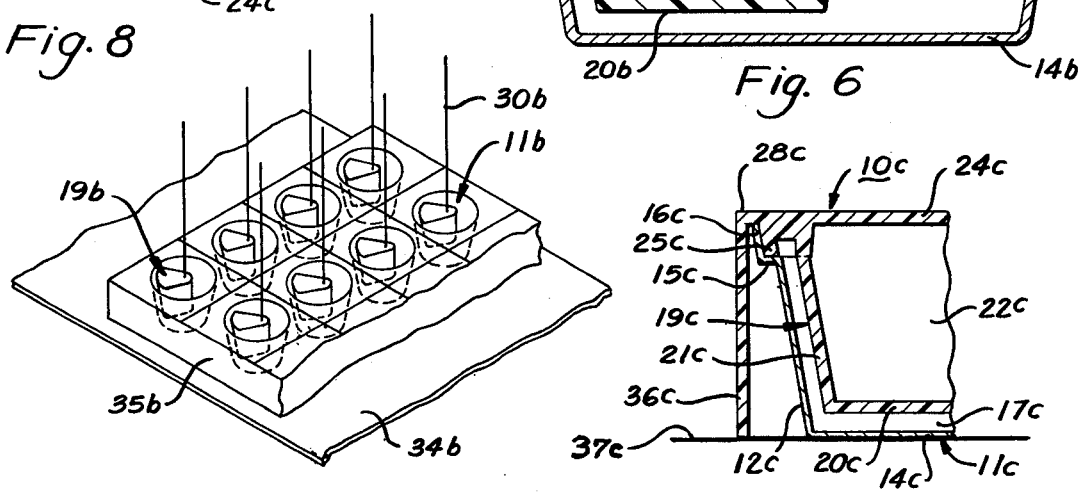

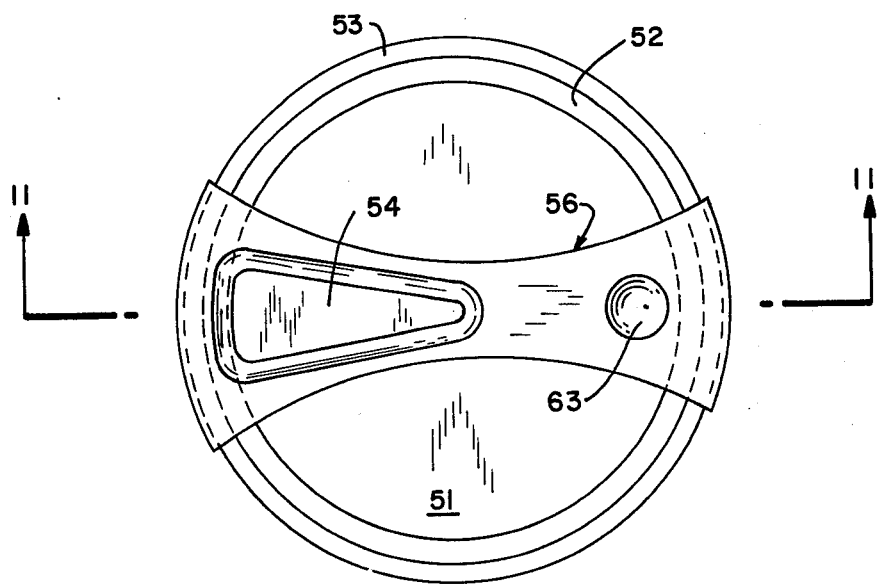
FIG.—10
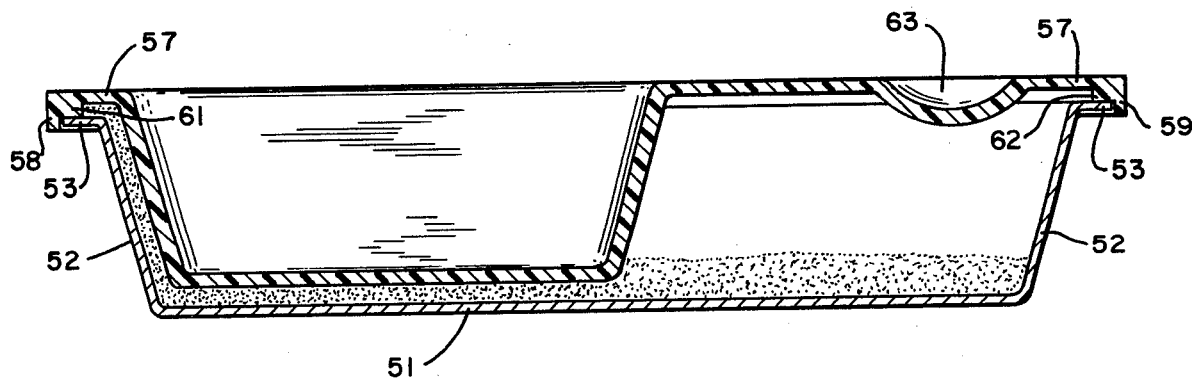
FIG.—11
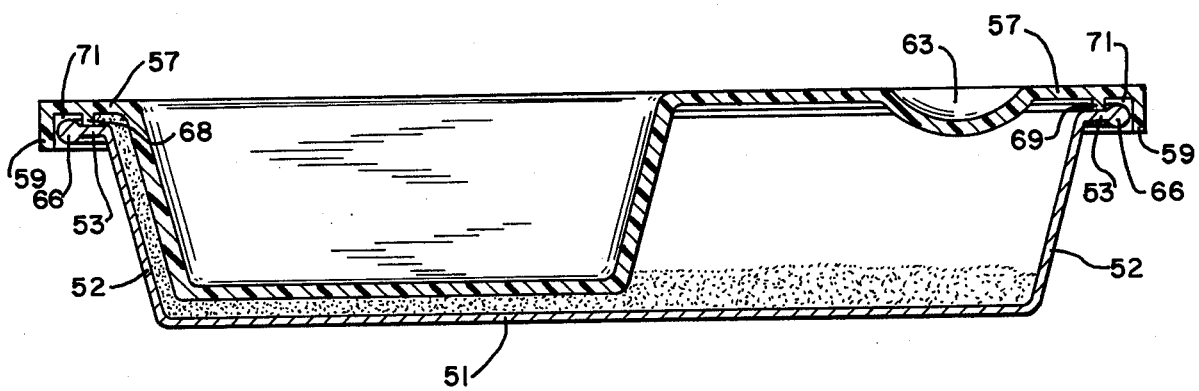
FIG.—12

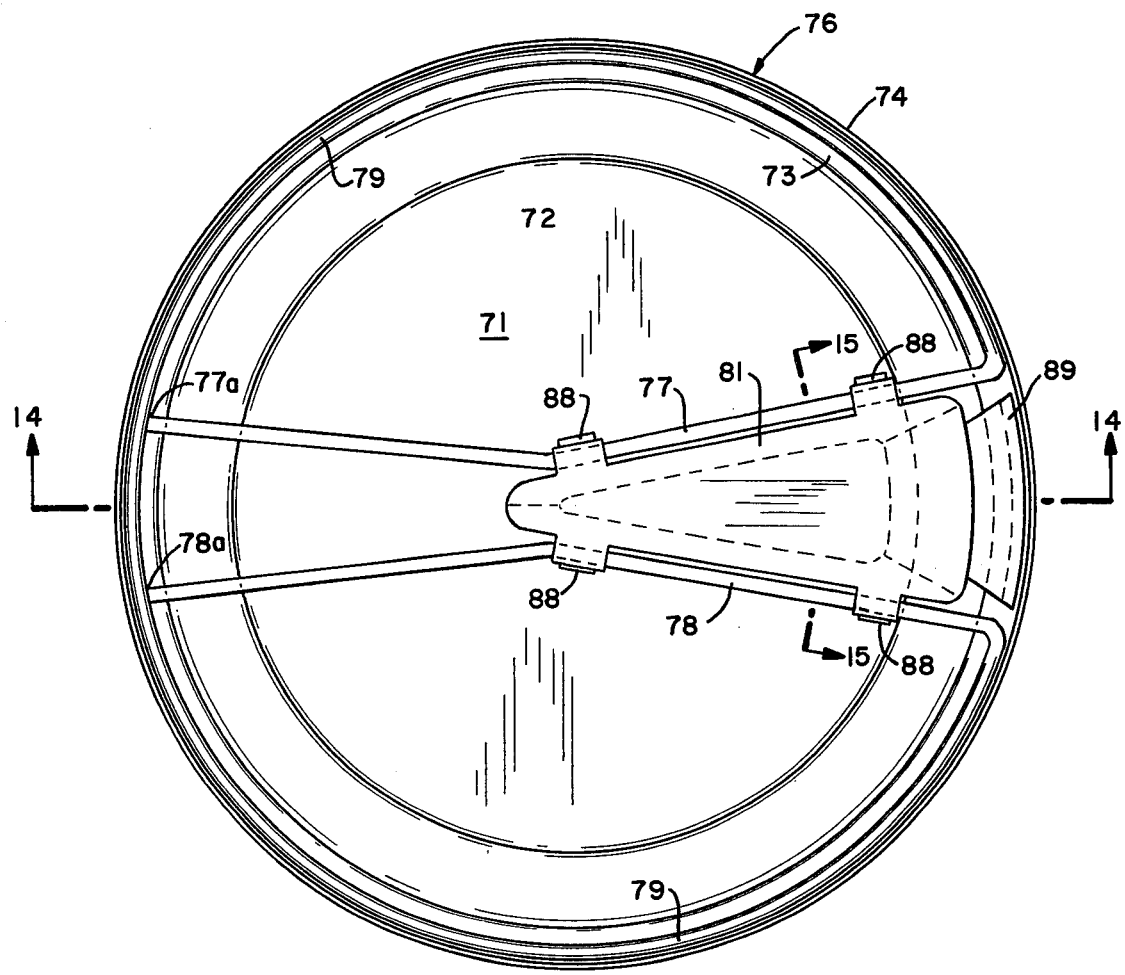
FIG.—13
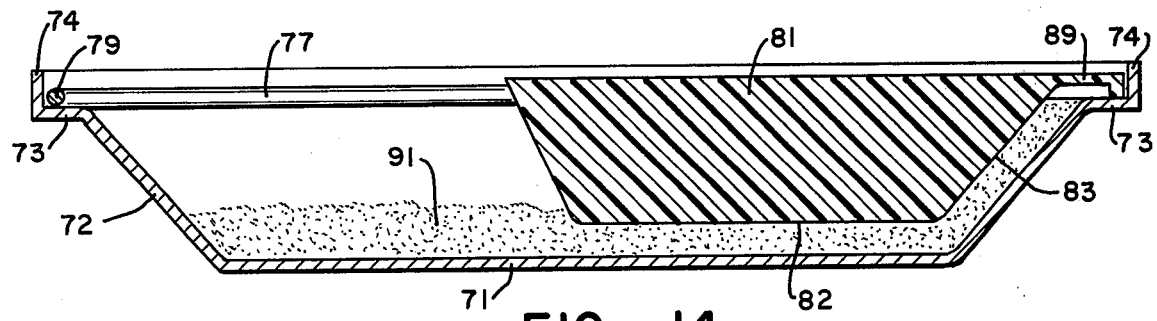
FIG.—14
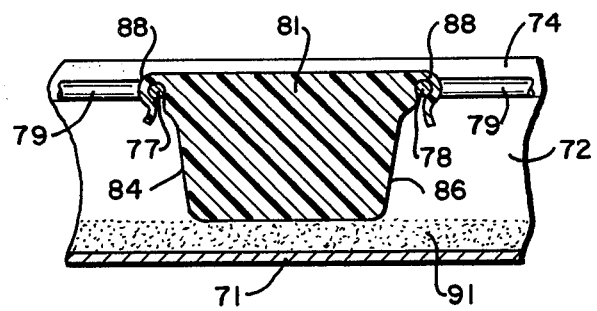
FIG.—15

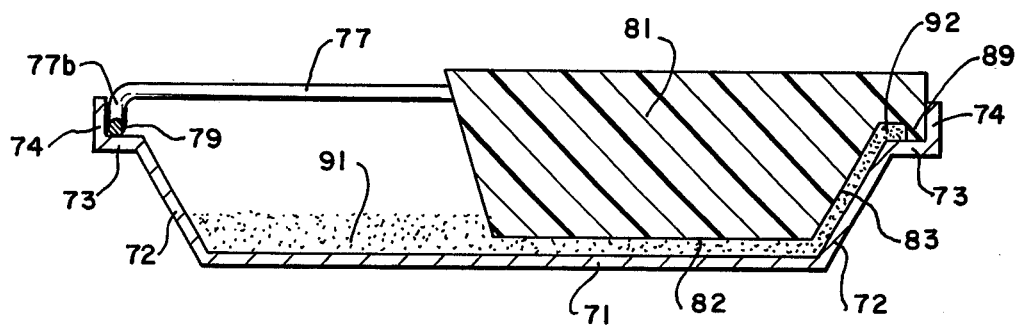
FIG.—16
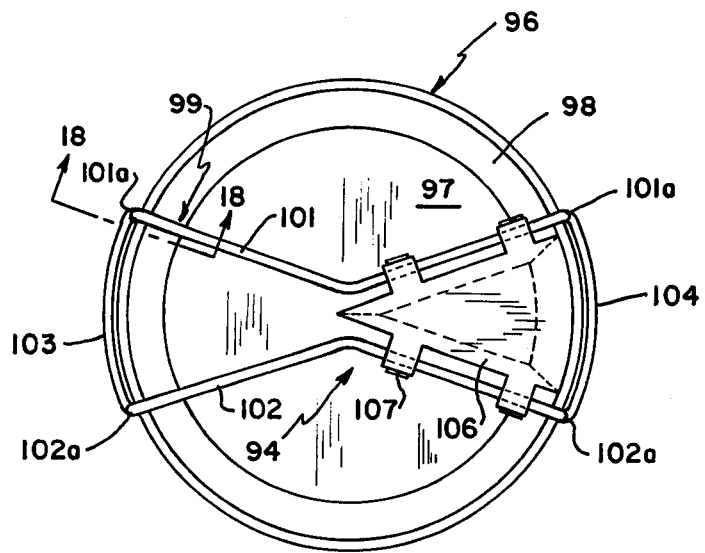
FIG.—17
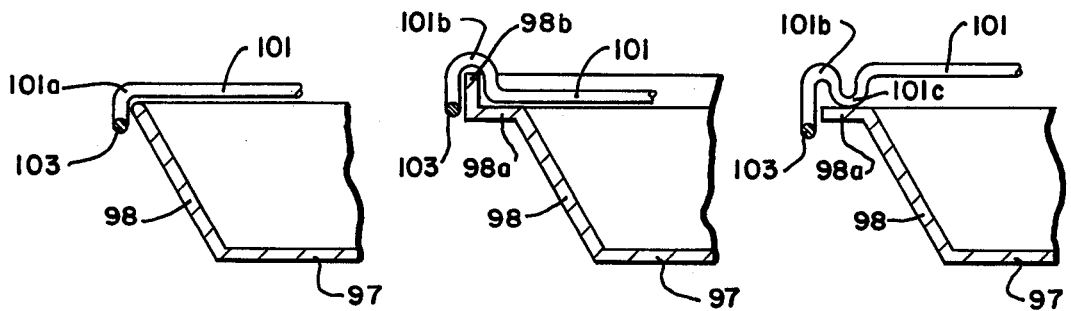
FIG.—18  FIG.—19  FIG.—20

CRUST FORMER

CROSS-REFERENCE TO RELATED APPLICATION

This application is a continuation-in-part of Ser. No. 361,654, filed May 18, 1973, now U.S. Pat. No. 3,902,837.

BACKGROUND OF THE INVENTION

This invention relates generally to the art of making crusts for food products and, more particularly, to apparatus for forming crusts for food products, either baked or chilled. In still more particular reference, the present invention is concerned with a crust former for constructing crusts in pans and like containers from a mass of crust material placed within the container for this purpose.

Food products, heated or chilled, are ever popular food items, and for this reason are produced in great quantities both commercially in large scale production for subsequent retail use and sale, and domestically, essentially on an individual basis, in the kitchen of the homemaker. A component of such baked and/or refrigerated goods is the crust which is present along the bottom and/or side walls of many such food products, and although various types of crusts may be provided, one that is often preferred is known as a "crumb crust". Crusts of this type may constitute an admixture of a crumb base (graham cracker or crushed grain flakes, for example) and a binder that enables the admixture to be worked and to maintain a crust shape imposed thereon.

As would be expected, apparatus of various structural and functional varieties has been proposed to facilitate and mechanize the work of forming such crusts including compression mechanisms in which a quantity of dough or other crust material is compressed between two die elements to force the crust material into the shape of the forming dies; rotatable mechanisms in which centrifugal force of sufficient magnitude is developed to cause the mass of crust material to spread outwardly from a spatially fixed center; and combinations of these two techniques in which both compressive force and centrifugal force are exerted against a semi-fluid crust material to enforce a predetermined crust shape thereon. Apparatus of this type has utility in commercial application, but is not suitable for domestic use, and whereas it tends to function satisfactorily with certain crust materials, such as pastry dough, it has undesirable limitations as respects other crust materials in either a domestic or commercial application.

I have heretofore proposed a device for use in forming crusts within pie pans and like containers, and such device constitutes the subject matter of my U.S. Pat. No. 3,451,359 which issued June 24, 1969. The crust shaper disclosed in such patent produces satisfactory results in most instances, and demonstrates a functional principle of undisputed integrity.

SUMMARY AND OBJECTS OF THE INVENTION

The invention provides an improved crust former of the character described that is structurally simple, functionally reliable, and easy to use, thereby making it equally suitable for domestic applications or commercial environments. The crust former is cooperative with a pie, cake or tart pan or any container having an annular parametric side wall. The crust former includes a forming head and support structure therefor which carries the head, directly or indirectly, in the sense of supporting, positioning, or otherwise relating the same to a container for relative rotation. The crust former in certain embodiments includes means for wiping or otherwise preventing accumulation of crust material along the rim or upper edge portion of the container side wall. The use of the wiper and a predetermined amount of crust material assures that the crust constructed by the former will have a predetermined height and will be clean and sharply defined along the upper edge thereof. The crust former may also include means by which it is easily gripped and held by one using the same, and because of the construction of the forming head, it can be rotated in either annular direction relative to the container to distribute a mass of crust material therein along the bottom and/or side walls thereof to construct a crust in juxtaposed covering relation therewith.

It is in general an object of the invention to provide an improved crust former which is especially suited for use with crust materials to construct crusts therefrom along the bottom and/or side walls of pans and other containers.

Another object of the invention is to provide a crust former of the above character having a forming head constrained for rotation about the center of the container to spread crust material along the walls of the container upon relative rotation of said forming head and container.

Another object of the invention is to provide a crust former of the above character in which the forming head can be rotated in either angular direction relative to the container to spread crust material in the container.

Another object of the invention is to provide a crust former of the above character which includes means for wiping or otherwise preventing the accumulation of crust material along the rim or upper edge portion of the container side wall.

Additional objects and features of the invention will be apparent from the following description in which the preferred embodiments are set forth in detail in conjunction with accompanying drawings.

BRIEF DESCRIPTION OF THE DRAWINGS

FIG. 3 is an enlarged broken transverse sectional view of an upper edge portion of the combination shown in FIG. 2;

FIG. 4 is a top plan view of a modified former shown in operative association with another type of container;

FIG. 5 is a transverse sectional view taken along the line 5—5 of FIG. 4;

FIG. 6 is a transverse sectional view of a further modified embodiment of the crust former illustrated in operative association with still another type of container;

FIG. 7 is a diagrammatic view showing use of a bank of formers of the type illustrated in FIG. 6 arranged with a conveyor for production forming of crust in containers therefor;

FIG. 8 is a broken top plan view of yet another embodiment of the crust former shown in association with a container;

FIG. 9 is a broken transverse sectional view taken along the line 9—9 of FIG. 8;

FIG. 10 is a top plan view of another embodiment of a crust forming device according to the invention in operative association with a container;

FIG. 11 is a transverse sectional view taken along the line 11—11 of FIG. 10;

FIG. 12 is a transverse sectional view taken along the line 11—11 of FIG. 10, illustrating a further embodiment of a crust forming device according to the invention;

FIG. 13 is a top plan view of another embodiment of a crust forming device according to the invention in operative association with a container;

FIG. 14 is a transverse sectional view taken along the line 14—14 of FIG. 13;

FIG. 15 is a fragmentary sectional view taken along the line 15—15 of FIG. 13;

FIG. 16 is a transverse sectional view, similar to FIG. 14, of another embodiment of a crust forming device according to the invention;

FIG. 17 is a top plan view of another embodiment of a crust forming device according to the invention;

FIG. 18 is a fragmentary cross-sectional view taken along line 18—18 of FIG. 17; and FIGS. 19 and 20 are fragmentary sectional views, similar to FIG. 18, of further embodiments of crust forming devices according to the invention.

DETAILED DESCRIPTION OF THE PREFERRED EMBODIMENTS

Figure 1:
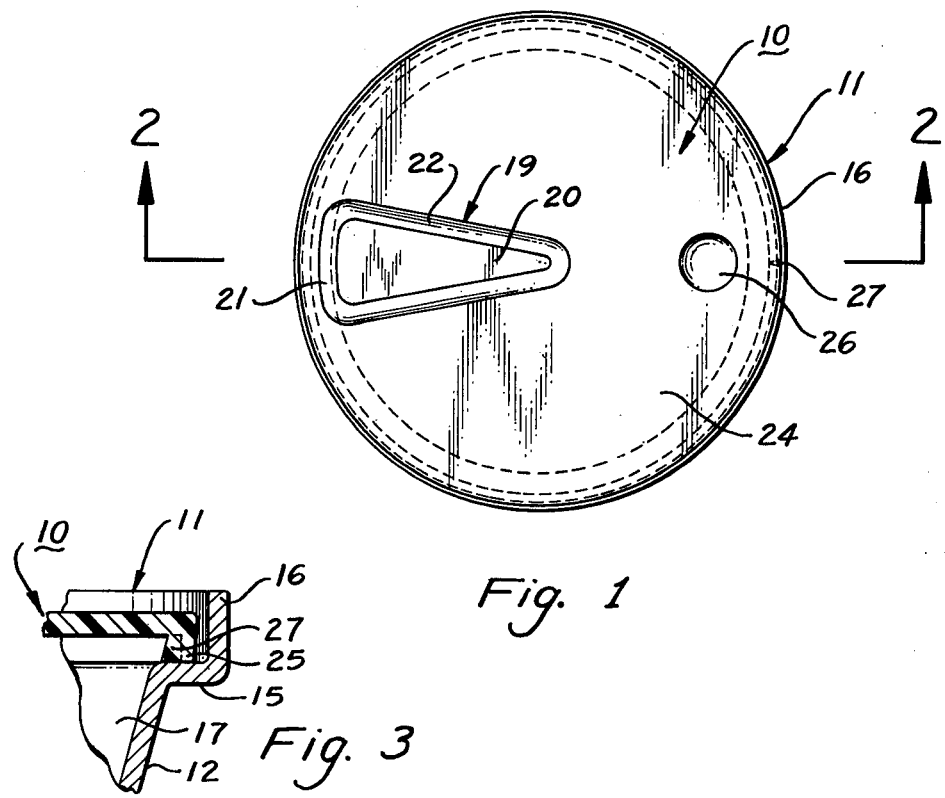
FIG. 1 is a top plan view of a crust former embodying the invention in operative association with a container.
Figure 2:
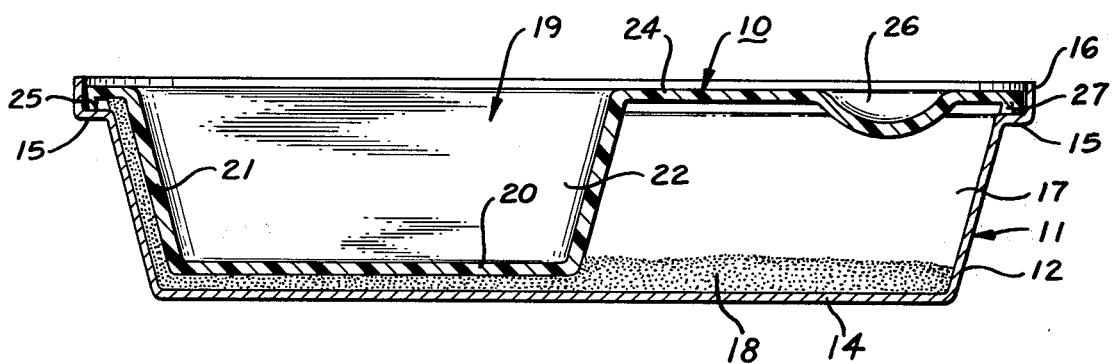
FIG. 2 is a transverse sectional view of the former and container taken along the line 2—2 of FIG. 1.

The crust former embodying the present invention is adapted for use with a pan or like container, and in FIGS. 1 and 2 the former 10 is shown in operative association with a container 11. As respects the present invention, the container 11 may be essentially conventional, and it has an annular perimetric side wall 12 extending upwardly from a relatively flat bottom wall 14. The side wall 12 is equipped adjacent the upper edge thereof with an outwardly projecting annular rim 15 terminating in an upwardly oriented annular flange 16. The flange 16 may be a raw or hemmed flange, or a raised or full bead. The side wall 12 inclines upwardly and outwardly so that the diameter of the container 11 is somewhat larger adjacent the inner edge of the rim 15 than it is adjacent the bottom wall 14. The angle of inclination of the side wall may vary considerably, and as will be evident hereinafter, the crumb crust former 10 can be used with containers having side walls that very closely approximate a vertical orientation relative to the bottom wall 14.

The rim 15 of the container 11 is substantially planar and generally parallels the bottom wall 14. The flange 16 is essentially vertical in the particular container 11 being considered, and it therefore defines with the rim 15 an included angle of approximately 90°. The lateral width of the rim 15 may vary substantially, as will be evident hereinafter. The container 11 may be fabricated from any suitable material such as metal, ceramic, or glass for use in conventional ovens or plastic, ceramic, glass or fiber for use with microwave ovens. As one specific example, the container 11 may be an aluminum foil structure integrally formed throughout and of the type commonly used for packaging baked, refrigerated, or frozen food items. Thus, the container is open at its top, and defines a chamber 17 adapted to receive materials therein and, as respects the present invention is adapted to receive a mass of crust material 18, as shown in FIG. 2.

The crust material 18 may constitute various ingredients such as an admixture of crumbs and a binder having a consistency such that the material can be compacted and will retain a form imposed thereon. Crusts for pies and cakes made from ingredients of this type are well known, and a specific example constitutes graham cracker crumbs mixed with shortening as a binder. As explained in detail hereinafter, the former 10 is effective to distribute the mass of crust material 18 along the bottom and/or side walls 14 and 12 of the container to construct a crust therein.

The crust former 10 includes a forming head 19 adapted to be rotated about the center of the container 11 to distribute the mass of crust material 18 therein along the bottom and side walls 14 and 12 to construct a crust in covering relation therewith, as illustrated along the left hand side of the container shown in FIG. 2. The forming head 19 has a generally planar bottom wall 20 and an upwardly extending side wall 21 respectively adapted to be disposed in spaced facing relation with the bottom wall 14 and side wall 12 of the container 11. The forming head 19 further includes closure wall structure 22 extending upwardly from the bottom wall 20 to serve therewith as a crust material spreader. In the form shown, the closure wall structure 22 extends upwardly to the same elevation as that of the side wall 21, and it is continuous therewith extending inwardly therefrom along generally radial lines toward the center of the former from each terminus of the side wall 21. Thus, the closure wall structure 22 is generally perimetric having a somewhat triangularly shaped configuration defining with the side wall 21 a hollow open space within the head 19. The forming head 19 can be formed as a solid member, if desired.

The construction of the forming head 19 enables the head to be rotated in either angular direction with respect to the container 11 so as to distribute the mass of crust material 18, as will be described in detail hereinafter. The closure wall structure 22 inclines downwardly and inwardly, as is most evident in FIG. 1, so that the radial width of the forming head 19 is greater adjacent the upper edge thereof than it is adjacent its bottom wall 20. The bottom wall 20 of the head 19 is of sufficient length to extend along generally radial lines from adjacency with the container side wall 12 through the container center portion. Thus, the length of the head 19 along the bottom wall 20 is of the general order of the radius of the container 11 along the bottom wall 14 thereof, and in any case it is preferable that the head extend at least to the center of the container. A forming head not having such dimensional relationship will tend to leave a mound of crumbs at the center of the container.

The head 19, as is clearly evident in FIG. 1, has an angular length that is less than 360°, and in the embodiment of the invention being considered, the angular width of the wedge-shaped head at the side wall 21 thereof is generally of the order of 30°. This specific dimension is not critical, and is given by way of a specific exemplification. Although the head 19 is hollow, it may be solid, and it need not be symmetrical about a radial center line therethrough (as previously stated) although such symmetry enables the head to be rotated in either angular direction. Further, in certain embodiments of the invention the closure wall structure 22 of the forming head 19 need not extend to the upper edge of the crust former 10 but may terminate adjacent the bottom wall 20 as long as it is of sufficient height to serve as a plow or spreader for the mass of crust material 18. It will be appreciated that extending the closure wall to the upper edge of the crust former 10 prevents crust material from entering the interior of the head 19. In other embodiments of the invention the bottom wall 20 may be open, the lower edge of the closure wall structure 22 forming the bottom wall of the head. In the embodiment of the invention under consideration, it will be apparent that the entire forming head 19 is of integral or unitary construction, and that the side wall 21 thereof conforms to the curvature of the container wall 12 and is rounded at its angularly spaced edges so as to facilitate movement of crust material into the space intermediate the facing side walls 12 and 21 of the container 11 and forming head 19.

The crust former 10 further includes support structure that carries the forming head 19 and is engageable with the upper edge portion of the container side wall 12 to positionally relate the forming head to the container and thereby establish the spatial relationship of the bottom and side walls 20 and 21 of the head with the respectively facing bottom and side walls 14 and 12 of the container. In the former 10 under consideration, such support structure takes the form of a cover 24 that engages the lip 15 through a depending flange 25. The flange 25 generally parallels the flange 16 and is located within the interior thereof in substantially contiguous relation therewith to prevent significant lateral play therebetween. In the form shown, the flange 25 is a perimetric annular flange having an arcuate length of 360°. Similarly, and as is evident in FIG. 1, the cover 24 is also continuous or of 360° so that the entire crust former 10 including the forming head 19 and cover 24 completely overlies and closes the container compartment 17.

The flange 25 is relatively narrow being substantially smaller in lateral extent than the container rim 15 so that the slidable engagement of the flange on the rim has a relatively low frictional inhibition to relative movement therebetween. In this respect, the entire crust former 10 is rotatable relative to the container 11, and to facilitate rotational displacements of the former with respect to the container, the cover 24 has a recess or depression 26 located in spaced relation with the forming head 19 inwardly of the flange 25 and container side wall 12 and along the radial axis of the head. The recess 26 enables one to place a digit therein to rotate the crust former in its entirety relative to the container 11 to distribute the mass of crust material 18 and construct a crust therefrom.

Figure 2A:
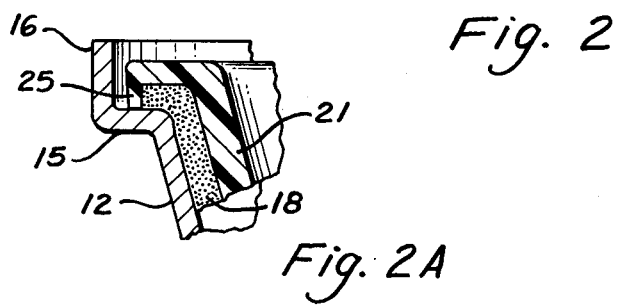
FIG. 2a is an enlarged broken transverse sectional view of an upper edge portion of the structure illustrated in FIG. 2 but with the crust material overlying the upper edge portion of the container.

Accordingly, relative rotation between the forming head 19 and container 11 may be effected in the crust former 10 by rotating the entire former with respect to the container (the container may be rotated about the former, if desired). Such rotation may tend to cause the crust material to collect along the ring 15, as shown in FIG. 2A, and the former 10 is provided with means for preventing accumulation of crust material along the rim. Such means comprises a wiper 27 engageable with the rim 15 to sweep the same upon relative rotation of the forming head 19 and container to remove crust material accumulations, thereby leaving the rim 15 relatively clean, as shown in FIG. 2. To facilitate return to the container 11 of the excess crust material that may tend to accumulate in front of the wiper 27 as it sweeps the rim 15, the wiper tapers inwardly and in the former 10, it is triangularly shaped, as seen in FIG. 1, and extends inwardly from the depending flange 25 toward the inner edge of the rim 15. The inner terminus of the wiper 27 may be inclined so as to substantially parallel the angular disposition of the container side wall 12, as is most evident in FIG. 3, although such angular disposition of the wiper is exaggerated owing to the limitations imposed by draft requirements where the former 10 is a molded product.

As respects the construction of the crust former 10, it may be constituted of any number of materials including natural and synthetic materials such as metal, paperboard, laminates such as paper and resin plastic films, synthetic plastics such as polystyrene and polyethylene, etc. In the particular embodiment of the invention under consideration, the crust former 10 is constituted of a synthetic thermoplastic material (polystyrene) molded integrally in the configuration shown. The crust former 10 may be opaque, colored, tinted, or transparent, as in the case of the particular embodiment of the invention being considered herein.

In use of the crust former 10, a predetermined mass of crust material 18 is placed within the container 11 along the bottom wall 14 thereof. The mass of crust material 18 need not be distributed along the bottom wall 14, but placed in a mound therein at the center of the container bottom wall 14. The crust former 10 is then positioned upon the container 11 with the depending flange 25 of the former seated upon the lip 15 of the container. The entire crust former 10 and container 11 are then rotated relative to each other through several complete rotations (four to six usually being sufficient) which is effective to cause the mass of material to be distributed uniformly to a predetermined thickness along the container bottom wall 14 and further causes the material to climb upwardly along the container side wall 12 to completely cover the same. The wiper 27 prevents material accumulation along the rim 15, and following the several required rotations, the entire crust former 10 is removed which leaves the container with a crust of uniform thickness and distribution constructed along the interior thereof.

As previously stated, the crust former 10 can be rotated in either angular direction relative to the container 11 because of the symmetrical construction of the head 19. Therefore, one using the crust former may use it in the manner most natural and convenient for his particular aptitudes. Once the crust is constructed, the container may then have the filling added thereto which, in the ordinary instance, will be pie, cake, or tart filling as, for example, a cheesecake filling. The entire container may then be placed within an oven and baked at the requisite temperature for the necessary time period to completely cook the content, or placed in a refrigerator to refrigerate the same, or both. Thereafter, the cooked and/or refrigerated product may be left within the container either in covered or uncovered condition depending upon the requirements of any user.

The modified embodiment of the invention illustrated in FIGS. 4 and 5 departs only in minor respects from the embodiment of the invention heretofore considered, and because of the general similarity of components of both the container and crust former, the same numerals are used to identify respectively corresponding elements except that the suffix *a* has been used for purposes of differentiation.

Comparing the contain 11a with the container 11 heretofore described, it will be apparent that the diameter of the container 11a is somewhat smaller and the vertical dimension is, but not necessarily, greater. The angular inclination of the perimetric annular side wall 12a is substantially the same as that of the side wall 12, and the rim 15a is considerably narrower in the lateral direction. The flange 16a is proportionally greater in vertical extent than the aforementioned flange 16. Otherwise, the containers 11a and 11 are essentially analogous in structure and function. Similarly, the crust formers 10a and 10 are analogous, and the forming head 19a is formed integrally with the support structure 24a which takes the form of a plate or cover having an angular extent of 360° which is able to overlie the entire container 11a. Rather than recess or depression 26 formed along the support structure, the cover 24a is equipped with an upwardly extending finger grip 26a useful in imparting rotational displacements to the crust former 10a relative to the container 11a.

Whereas the support structure 24 of the crust former 10 engaged the container 11 entirely through the depending flange 25, the support structure 24a not only has a depending flange 25a that rides upon the narrow rim 15a, but it also has an outwardly extending edge portion of flange 28a that overhangs and seats upon the upwardly extending flange 16a of the container. Accordingly, the crust former 10a is supported by substantial engagement of both the depending flange 25a and outwardly extending flange 28a with the upper end portion of the container wall 12a and, in particular, with the rim 15a and flange 16a thereof, respectively. A wiper 27a extends inwardly from the flange 25a to limit the height of the crust former along the container side wall 12a intermediate such side wall, and the facing side wall 21a of the forming head 19a. It will be appreciated that the flange 25a essentially constrains the crust former 10a against lateral displacement relative to the container and the flange 28a establishes the vertical constraint so that the combined actions of the depending flange 25a and the outwardly extending flange 28a establish the desired spatial relationship between the forming head 19a and container side wall 12a and bottom wall 14a. Accordingly, the flange 25a may be located along exterior of the flange 16a and perform the same function.

The container 11a and crust former 10a are used in the manner heretofore described with respect to the embodiment of the invention shown in FIGS. 1 through 3. That is to say, a predetermined or measured quantity of crust material is placed within the compartment 17a of the container, the crust former 10a is placed in position as shown in FIG. 5, and the forming head 19a is then rotated relative to the container for several complete revolutions so as to construct a crust by distributing the material uniformly along the bottom wall 14a and side wall 12a of the container. When the crust is adequately developed, the crust former 10a is removed and the crust-equipped container 11a processsed in a conventional manner, as heretofore explained.

The further modified embodiment of the invention illustrated in FIGS. 6 and 7 again corresponds in essentials to the embodiments of the invention heretofore considered, and the same numerals are used to identify the respectively correponding elements except that the suffix b has been added for purposes of differentiation. The container 11b is somewhat smaller than the container 11 heretofore described, and the side wall 12b has a somewhat more vertical inclination, but neither is necessarily so. The rim 15b is relatively narrow as in the case of the rim 15a shown in FIG. 5, but is not necessarily so.

The crust former 10b is generally similar to the crust formers heretofore considered except that the forming head 19b is not formed integrally with the support structure 24b and is rotatable relative thereto. In this reference, the support structure 24b is provided therealong with a bearing 29b through which extends a drive shaft 30b embedded within the forming head 19b in alignment with the center of the container 11b and constrained against rotation with respect to the head. The drive shaft 30b forms a part of the support structure for the forming head 19b, and it is journaled for rotation in the bearing 29b. Upon rotation, the shaft 30b rotatably drives the forming head 19b relative to the support 24b and relative to the container 11b. The vertical position of the drive shaft 30b in relation to the container 11b, and therefore the vertical position of the head 19b in relation thereto, is established by a stop 31b that seats upon the upper surface of the bearing 29b and is fixed to the drive shaft as, for example, by means of a set screw 32b.

The support structure 24b can include a narrow strip or a continuous cover, the latter being present in the specific embodiment of the invention under consideration, and it may, as it does in the form shown, seat within the flange 16b of the container and directly upon the narrow rim 15b thereof. Therefore, the strip or cover portion of the support structure 24b engages the container 11b throughout a sufficient area to constrain the same against rotation as the forming head 19b is rotatably driven in either direction via the shaft 30b to distribute crust material (not shown) within the container 11b to construct a crust therewithin, as previously explained.

Whereas the crust former 10a more readily adapts to domestic use, the crust former 10b is especially adaptable for use in a bank of crust formers that may be arranged along a production line where crusts are formed within a plurality of containers by automatic or semiautomatic processes. Such an arrangement is illustrated diagrammatically in FIG. 7 in which a conveyor 34b is adapted to transport a plurality of containers 11b through a succession of stations. At one station, a measured quantity of crust material is deposited in each of the containers. Thereafter, a crust is formed from such material by operation of a plurality of crust formers 10b. Filling is then added to the containers, and they are then moved through an oven or refrigerated area which bakes or chills the crust and filling in any desired and feasible manner.

In the arrangement shown in FIG. 7 support means is provided for the containers, and in this particular application, a plurality of containers 11b are respectively positioned within cavities provided for that purpose in a platform or holder 35b supported upon the conveyor 34b so as to be transported thereby through the various stations heretofore described. At the crust forming station a plurality of crust formers 10b arranged in a bank is carried by support means (represented by the shafts 30b) and the formers are lowered, or the containers raised, into operative association with the respectively aligned containers 11b, as shown in FIG. 7. The shafts 30b are then energized so as to rotate the forming heads 19b relative to the containers. The crust formers and heads 19b thereof can be accurately located relative to the containers 11b in any suitable manner as by guide or support means which, in the specific embodiment of the invention shown in FIG. 7, comprises the support shafts 30b and their positional relationship to the respectively aligned containers supported within the cavities therefor provided by the platform 35b. Thus, the heads are carried by suitable support means or structures in the sense of being positionally related thereby to the respectively associated containers. After the crusts are constructed, the bank of crust formers 10b is elevated, or the containers 11b is lowered, to withdraw the forming heads 19b from the containers preparatory to a subsequent cycle of operation.

The modified construction illustrated in FIGS. 8 and 9 is also generally similar to the embodiments of the invention heretofore considered although in general appearance it departs somewhat from the structural configurations of the prior-described embodiments of the invention. Nevertheless, evident overall functional and constructional identities pertain, and the same numerals are again used to identify respectively corresponding elements of both the container and crust former except that the suffix c has been used to differentiate this embodiment of the invention from those previously considered. Generally stated, and as is most evident in FIG. 9, the container 11c is essentially the same as those heretofore considered (but may be constructed without a flange, have curled or rolled edges or be made with a rim having neither flanged nor curled or rolled edges). The crust former 10c cooperates therewith to construct a crust from a mass of crust forming material located within the container, all as previously described.

The forming head 19c of the crust former 10c is formed integrally with the support structure 24c so that relative rotation therebetween is not permitted. Accordingly, during use of the crust former 10c, the container 11c and the crust former, in its entirety, rotate relative to each other. The crust former 10c is also positionally related to the container 11c in the general manner of the aforementioned crust former 10a in that it has a depending flange 25c and an outwardly extending edge or flange 28c which respectively engage the rim 15c and flange 16c of the container.

As shown best in FIG. 8, the support structure 24c has an angular extent less than 360° so that it overlies a somewhat pie-shaped portion of the container 11c, and along one of its generally radial edges it has a notch or recess 26c that facilitates gripping the same during use thereof. A depending skirt 36c (FIG. 9) extends downwardly from the outwardly extending edge or flange 28c of the support structure, and such skirt is spaced outwardly from the depending flange 25c so as to enable the container flange 16c to be received in the space defined therebetween. Should any particular container not have such an upwardly extending flange 16c, the crust former 10c is nevertheless usable therewith, the space between the flange 25c and skirt 36c simply being either partially filled of left as a void.

The skirt 36c is sufficiently long in a vertical sense that the skirt and the container can rest upon a table top or other common support surface 37c, thereby enabling the container and crust former to be rotated relative to each other. In this embodiment of the invention, relative rotation is best effected by constraining the crust former 10c against rotation with the skirt 36c thereof firmly resting upon the support surface and by then rotating the container 11c relative thereto. The depending flange 25c wipes along at least a portion of the lateral width of the container rim 15c, thereby preventing accumulation of crust material therealong as desired. In the embodiment of the invention shown in FIGS. 6 and 7, it will be apparent that the support structure 24b also serves to prevent accumulation of crust material along the rim 15b by being in engagement therewith.

The embodiment of FIGS. 10 and 11 is particularly suitable for use with a container having a bottom wall 51 and a side wall 52, the upper portion of which terminates in a plain annular rim 53. In this embodiment, the crust former has a forming head 54 similar to forming head 19 described above and a support structure 56 which engages the container rim and constrains the forming head for rotation about the center of the container.

As illustrated, support structure 56 comprises support member or a plate 57 which extends diametrically of the container and overlies a portion of the same. Arcuately extending depending flanges 58, 59 are provided toward the outer ends of support plate 57 in position to engage the outer edge of container rim 53 and thereby constrain the crust former for rotation about the center of the container. Additional flanges 61, 62 are provided adjacent to flanges 58, 59 and positioned to engage at least a portion of the upper surface of rim 53. Flanges 61, 62 provide bearing surfaces which facilitate rotation of the crust former on the container, and in addition they serve as wipers which prevent undesired accumulation of crust material along the rim. A finger hold 63 is formed in support member 57 to facilitate gripping at the crust former in the operation thereof.

Like the other embodiments described herein, the crust former of FIGS. 10 and 11 can be fabricated of any suitable material, such as plastic, and can be formed as a unitary structure by a suitable process such as molding.

Operation and use of the crust former of FIGS. 10 and 11 is similar to that of the other embodiments described above. A measured quantity of crust material is placed on the bottom wall of the container, the forming head is positioned in the container, and the crust former rotated in either angular direction to distribute the crust material along the bottom wall and/or side wall of the container.

Although illustrated in conjunction with a container having an annular rim, the crust former of FIGS. 10 and 11 can also be utilized with a container having no rim at all, as can other embodiments described herein. With a rimless container, the inner surfaces of either flanges 58, 59 or flanges 61, 62 would be positioned to engage the outside portion of the container side wall, and the lower surface of either flanges 61, 62 or support member 57 would rest on the top portion of the side wall.

The crust former of FIG. 12 is similar to the embodiment of FIGS. 10 and 11 except that it is particularly suitable for use with a container having a bead or flange 66 extending upwardly from the container rim. Like reference numerals are used to designate corresponding elements in FIGS. 10-12. The crust former of FIG. 12 differs from that of FIGS. 10 and 11 in that it has inner depending flanges 68, 69 which are spaced from flanges 58, 59 to form recesses 71, 72 which receive the upwardly extending bead or flange of the container.

In operation and use, the crust former of FIG. 12 is placed on the container with outer flanges 58, 59 and inner flanges 68, 69 on opposite sides of the container bead or flange. The outer flanges engage the outer surface of the container flange or bead and thereby constrain the crust former for rotation about the center of the container. The inner flanges engage at least a portion of the upper surface of the container rim and position the bottom wall and the side wall of the forming head a predetermined distance from the bottom wall and the side wall of the container. A mass of crust material placed on the bottom wall of the container is distributed by rotating the crust former and/or the container in either angular direction in the manner described above. During such rotation, the inner flanges of the crust former sweep crust material from the portion of the container rim engaged thereby.

The embodiment of FIGS. 13-15 is illustrated in connection with a container having a bottom wall 71 and a parametric side wall 72, the upper portion of which terminates in a laterally extending annular rim 73 having a generally cyclindrical flange 74 extending upwardly from the outer periphery thereof. In this embodiment, the crust forming device has a supporting framework 77 which is fabricated of a rigid material such as metal or plastic. The material can either be solid, as illustrated, or it can be tubular. This framework includes a pair of spaced apart arms 77, 78 which extend generally diametrically of the container and an arcuately extending arm 79. Arm 79 is adapted to rest upon the upper surface of rim 73 and engage the inner surface of flange 74 to constrain the forming head for rotation about the center of the container. In the preferred embodiment, the framework is fabricated of a single length of wire which is bent in the manner illustrated, and the ends 77a, 78a are secured to arcuate arm 79 by suitable means such as welding.

The embodiment of FIGS. 13-15 also includes a forming head 81 which is generally similar to forming head 19. The forming head includes a bottom wall 82, a side wall 83, and generally radially extending walls 84, 86 which extend between the lateral margins of bottom wall 82 and side wall 83. The forming head is removably mounted on diametrically extending arms 77, 78 by mounting clips 88 which extend from the radial walls of the forming head. The forming head includes a radially extending wiper 89 which overlies at least a portion of container rim 73 and prevents undesired accumulation of crust material thereon.

Although forming head 81 is illustrated as being solid, it can be hollow as in the other embodiments, if desired. Interchangeable forming heads can readily be utilized in the embodiment of FIGS. 10-to provide different crust thickness and to accommodate containers having different depths and side wall inclinations. The other embodiments described herein can likewise be provided with interchangeable forming heads, if desired.

Operation and use of the crust forming device of FIGS. 13-15 is similar to that of the other embodiments described above. A measured quantity of crust material 91 is placed on the bottom wall of the container, and the crust former is positioned on the container and rotated in either angular direction so that the forming head distributes the crust material along the bottom wall and/or side wall of the container.

The crust forming device of FIG. 16 is similar to the embodiment of FIGS. 13-15 except arcuately extending arm 79 is offset downwardly of diametrically extending arms 77, 78, whereby arms 77, 78 are spaced away from container rim 73 when arm 79 engages the upper surface of the rim. As illustrated, the end portions of arms 77, 78 are formed with downwardly extending portions 77b, 78b to provide the desired offset.

Operation and use of the embodiment of FIG. 16 is similar to that of the embodiment of FIGS. 13-15. However, since arms 77, 78 are spaced above the rim, crust material is formed along the inner portion of rim 73 in the region designated by reference numeral 92. In the embodiment of FIGS. 13-15, material in this region is wiped away by arms 77, 78.

FIGS. 17 and 18 illustrate a crust forming device 94 in association with a rimless container 96 which has a generally planar bottom wall 97 and an outwardly inclined parametric side wall 98. The forming device includes a framework 99 which comprises a pair of spaced apart arms 101, 102 similar to arms 77, 78. Toward their ends, arms 101, 102 are formed with downwardly extending legs 101a, 102a, and arcuate arms 103, 104 extend between the ends of arms 101, 102 on opposite sides of the container. Arms 103, 104 are offset downwardly of arms 101, 102 and when arms 101, 102 engage the upper margin of side wall 98, arms 103, 104 lie outside the container, whereby the forming device is constrained for rotation about the center of the container. A forming head 106, similar to forming head 81, is removably mounted on arms 101, 102 by mounting clip 107.

Operation and use of the crust forming device of FIGS. 17-18 is similar to that of the other embodiments described herein. A measured quantity of crust material is placed on the bottom wall of the container, and the crust former is positioned on the container, as illustrated, and the forming head is rotated in either angular direction to distribute the crust material along the bottom wall and/or side wall of the container.

If desired, the forming device of FIGS. 17-18 can be utilized with other types of containers, such as a pan having a flanged rim as, for example, illustrated in FIGS. 13-15. With such a pan, arcuate arms 103, 104 would engage the upper surface of the annular rim and the inner surface of the cylindrical flange to constrain the forming head against lateral movement and for rotation about the center of the container. Arms 101, 102 would be spaced above the upper surface of the rim, enabling the crust material to be formed on the inner portion of the upper surface of the rim, as in the embodiment of FIG. 16.

In the embodiment shown in FIG. 19, the upper portion of container side wall 98 is formed to include a laterally extending annular rim 98a and an upstanding cylindrical flange 98b. The crust forming device of this embodiment is generally similar to the device of FIGS. 17-18 and like reference numerals are used to designate corresponding elements. In the embodiment of FIG. 19, however, arms 101, 102 are forme to include upwardly extending U-shaped portions 101b, 102b towards the ends thereof. Arms 101, 102 engage the upper surface of rim 98a, and U-shaped arcuate arms 103, 104 adjacent to the outer periphery of the container flange.

In the embodiment shown in FIG. 20, the upper portion of container side wall 98 is formed to include a laterally extending annular flange 98a. The forming device is generally similar to the embodiment of FIGS. 17-18, and like reference numerals are used to designate corresponding elements. In the embodiment of FIG. 20, however, arms 101, 102 are formed toward their ends to include upwardly extending U-shaped portions 101b, 102b and downwardly extending U-shaped portions 101c, 102c. As illustrated, the downwardly extending U-shaped portions engage the upper surface of container rim 98a, and arcuate arms 103, 104 lie outside the container. The embodiment of FIG. 20 can be utilized with other types of containers such as flanged containers or containers having rolled or beaded rims, with the flanges or beads being received in the upwardly extending U-shaped portions of the arms, as in the embodiment of FIG. 19. Similarly, the downwardly extending U-shaped portions of the arms can be positioned for wiping crust material from all or part of the container rim, as desired.

Operation and use of the embodiments of FIGS. 19 and 20 is similar to that of the other embodiments described herein. A measured quantity of crust material is placed on the bottom wall of the container, the support member carrying the forming head is positioned on the container, and the forming head is rotated in either angular direction to distribute the crust material along the bottom wall and/or side wall of the container.

In all embodiments of the invention, the crust formers are conveniently usable and function to distribute quickly and easily about the interior of a container a predetermined mass or measured quantity of crust forming material to construct a crust therefrom along the bottom wall of the container and/or along the upwardly extending side wall thereof. The upper edge of the crust thusly constructed is relatively clean and sharp because accumulation of the crust material along the rim-equipped upper edge of the container is prevented by structure provided for this purpose and by the use of a premeasured mass of crust material. The crust formers are suited both for home or domestic use, and are equally adaptable to the quantity production required in commercial baking establishments.

Although each of the embodiments of the invention illustrated in the drawings discloses a forming head operative to distribute crust material along both the bottom and side walls of the associated container, as shown in FIG. 2, it should be understood that forming heads may be provided having different spatial relationships between the bottom and side walls thereof and the respectively facing bottom and side walls of the container with which it is used so that a crust may be formed along either the bottom or side wall of the container and not along the other. For example, the forming head 19 shown in FIG. 2 may be sufficiently deep in its vertical dimension that the bottom wall 20 thereof essentially seats upon the upper surface of the container bottom wall 14. With such spatial relationship between the facing walls 14 and 20, the forming head will construct a crust only along the side wall 12 of the container. Analogously, should the side wall 21 of the forming head be in substantially contiguous relation with the side wall 12 of the container, the crust constructed by the forming head would exist only along the container bottom wall 14.

The side wall of the forming head, as previously explained conforms substantially to the configuration of the facing sidewall of the associated container for an angular length sufficient to insure maintenance of the crust material along the container wall as the forming head moves past each section thereof. The forming head is movable, selectively, in opposite directions so that the head is able to plow or push the crust material in either direction. In the embodiment of the invention shown in FIGS. 6 and 7, the support means for the containers and for the forming heads are movable in generally vertical directions relative to each other and are also relatively rotatable so that as in the first instance, each forming head is enabled to be inserted into the container therefor and subsequently removed therefrom after the crusts are constructed and, in the second instance, to enable each forming head to be rotated relative to the associated container. The relative vertical movements of such means and the respectively associated forming heads and containers also constitute adjustment means in the sense that the positional relationship of each forming head with respect to the container is established by such means, and in the further sense that the relative positions of the forming heads and associated containers can be changed to vary crust thicknesses by varying the extent to which the forming heads are inserted into the containers.

It will further be apparent that forming heads of different types can be provided not only to change the aforementioned spatial relationship of the bottom wall and side wall of the head with the respectively facing bottom wall and side wall of the container, as previously explained, but also to conform the forming heads to containers having different angles of inclination along the side walls thereof and/or different depths. Facility in interchangeability of heads is most evident in the embodiments of the invention shown in FIGS. 6–7 and 13–20, but it should be understood that in each embodiment of the invention, the heads may be removably and interchangeably related to the associated support structures.

From the foregoing, it is apparent that a new and improved crust former has been provided. While only the preferred embodiments have been set forth in detail, as will be apparent to those familiar with the art, certain changes and modifications can be made without departing from the scope of the invention as defined by the following claims.

I claim:

1. A crust former adapted for use with a container having an annular perimetric side wall extending upwardly from a bottom wall and equipped adjacent its upper edge with an outwardly projecting annular rim, comprising: a forming head relatively rotatable with respect to such container generally about the center thereof to distribute a mass of crust material along at least one of the walls of the container to construct a crust therein, said forming head having a generally sector-shaped bottom wall with outwardly diverging lateral margins and an upwardly extending side wall respectively conforming to the general configurations of the bottom wall and a portion of the side wall of such container and further having a pair of outwardly diverging walls extending upwardly from the lateral margins of the bottom wall of said head to serve as crust material spreaders upon rotation of the forming head in either angular direction, the bottom wall of said head being of sufficient length to extend generally from adjacency with the container side wall to at least the center portion of the container, the side wall of the forming head having an annular length less than 360°; and support structure connected with said head and engageable with the upper portion of the side wall of such container to positionally relate said forming head thereto and thereby establish a predetermined positional relation with the bottom wall and side wall of the forming head facing the bottom wall and side wall of such container; said head and such container being relatively rotatable to effect construction of a crust within the container.

2. The crust former of claim 1 further comprising means provided by said former preventing accumulation of crust material along the rim of such container.

3. The crust former of claim 2 in which said means includes a wiper fixedly related to said head for relative rotation therewith with respect to such container to engage and sweep the rim thereof to remove crust material accumulation therefrom.

4. The crust former of claim 3 in which said head and support structure are fixed one to another to prevent relative rotation therebetween, and in which said wiper is carried by said support structure.

5. The crust former of claim 1 in which said head is rotatable relative to said support structure, and in which said support structure has a perimetric edge portion engageable with the rim of such container to prevent rotation between the support structure and container, said edge portion serving to prevent accumulation of crust material along the container rim.

6. In a device for spreading material to form a crust in a container having a bottom wall and a peripheral side wall: a forming head having a generally sector-shaped bottom wall with outwardly diverging lateral margins, a side wall conforming generally to at least a portion of the contour of the side wall of the container and having an arc length less than 360°, and a pair of radially extending walls adjoining the lateral margins of the bottom wall and side wall of the forming head; and means connected to the forming head for supporting the forming head within the container with the bottom wall and side wall of the forming head facing the corresponding walls of the container and the radially extending walls diverging outwardly from the central portion of the container, said means cooperating with the container to constrain the forming head for rotation in either angular direction about the center of the container to effect spreading of crust material in the container to form a crust.

7. The crust forming device of claim 6 wherein the means for supporting the forming head includes a support member engaging the upper portion of the side wall of the container.

8. The crust forming device of claim 7 wherein the forming head is rotatively mounted on the support member.

9. The crust forming device of claim 7 wherein the support member includes arcuately extending guide means for engaging the upper portion of the side wall of the container.

10. The crust forming device of claim 6 wherein the forming head is removably mounted on the means for supporting the same.

11. The crust forming device of claim 6 further including a wiper constrained for rotation with the forming head for removing crust material from a portion of the upper portion of the side wall of the container.

12. In a device for spreading material to form a crust in a container having a bottom wall, a peripheral side wall, an annular rim extending laterally from the upper edge of the side wall, and a generally cylindrical surface extending upwardly from the annular rim: a support member adapted to rest in a predetermined position upon the rim and overlie at least a portion of the container while engaging the generally cylindrical surface of the container, thereby serving to restrain the support member against movement from the predetermined position; a shaft rotatably mounted on the support member and extending axially of the container when the support member is in the predetermined position; and a forming head affixed to the shaft having bottom and side walls with arc lengths less than 360° adapted to face the bottom and side walls of the container for spreading material to form a crust in the container upon relative rotation of the shaft and container.

13. In a device for spreading material to form a crust in a container having a bottom wall and a peripheral side wall: a rotatable shaft extending axially of the container and a forming head affixed to the shaft having a generally sector-shaped bottom wall with outwardly diverging lateral margins, a side wall conforming generally to the contour of the side wall of the container and having an arc length less than 360°, and a pair of radially extending walls adjoining the lateral margins of the bottom wall and the side wall of the forming head, the bottom and side walls of the forming head being positioned adjacent to the bottom and side walls of the container and the radially extending walls diverging outwardly for spreading material to form a crust in the container upon rotation of the shaft in either angular direction.

14. In a crust former adapted for use with a container having a bottom wall and a peripheral side wall extending upwardly from the bottom wall:
   A. a forming head relatively rotatable with respect to the container generally about the center thereof to distribute crust material along at least one of the walls of the container to construct a crust therein, said forming head comprising
      1. a generally sector-shaped bottom wall having outwardly diverging lateral margins of sufficient length to extend from adjacency with the side wall of the container to at least the center portion of the bottom wall of the container,
      2. a side wall extending upwardly from the outer margin of the bottom wall of the forming head, said side wall having a contour conforming generally to at least a portion of the side wall of the container and an arc length less than 360°, and
      3. a pair of outwardly diverging upstanding walls extending between the lateral margins of the side wall and the bottom wall of the forming head; and
   B. support means engageable with the upper portion of the container for positioning the bottom wall of the forming head a predetermined distance below the upper margin of the container side wall, said support means establishing a predetermined positional relation between the side wall of the forming head and the side wall of the container and constraining the forming head for rotation generally about the center of the container, the crust former being supported and guided by the container alone with no external support.

15. In a crust former adapted for use with a container having a bottom wall and a peripheral side wall extending upwardly from the bottom wall:
   A. a forming head relatively rotatable with respect to the container generally about the center thereof to distribute crust material along at least one of the walls of the container to construct a crust therein, said forming head comprising
      1. a generally sector-shaped bottom wall having outwardly diverging lateral margins of sufficient length to extend from adjacency with the side wall of the container to at least the center portion of the bottom wall of the container, 2. a side wall extending upwardly from the outer margin of the bottom wall of the forming head, said side wall having a contour conforming generally to at least a portion of the side wall of the container and an arc length less than 360°, and
3. upstanding marginal wall portions extending between the lateral margins of the side wall and outwardly diverging lateral margins of the bottom wall of the forming head for spreading the crust material when the forming head and container are rotated relative to each other in either angular direction to construct the crust in the container; and B. support means cooperating with the container for positioning the forming head within the container with the bottom and side walls of the forming head facing the corresponding walls of the container and constraining the forming head for rotation about the center of the container.

16. The crust former of claim 15 further including means connected with the forming head for wiping crust material from a portion of the upper portion of the side wall of the container.

17. In a device for spreading material to form a crust in a container having a bottom wall and a peripheral side wall: a support member having means to extend generally diametrically of the container and to overlie a portion of the container, arcuately extending flanges depending from the support member and engageable with the outer portion of the side wall of the container to thereby position and constrain the forming device for rotation about the center of the container, a forming head affixed to the support member having bottom and side walls with arc lengths less than 360° facing the bottom and side walls of the container and radially diverging walls extending between the bottom and side walls of the forming head to provide surfaces for spreading material to form a crust in the container upon relative rotation of the forming device and the container.

18. The crust forming device of claim 17 wherein the container side wall includes an annular rim extending laterally from the upper portion thereof and wherein the flanges of the forming device are disposed to engage the outer edge of the annular rim.

19. The crust forming device of claim 18 further including additional flanges disposed inwardly of the first named flanges and adapted to engage the upper surface of the container rim.

20. The crust forming device of claim 19 wherein the additional flanges are spaced a predetermined distance from the first named flanges.

21. A crust forming device adapted for rotation about the center of a container having a generally circular bottom wall and a peripheral side wall to spread material and thereby form a crust in the container, said device comprising: a forming head having a generally sector-shaped bottom wall having outwardly diverging lateral margins, a side wall conforming generally to the contour of the side wall of the container and having an arc length less than 360°, and a pair of radially extending walls adjoining the lateral margins of the bottom wall and the side wall of the forming device for spreading the material to form the crust upon rotation of the forming device in either angular direction, and means connected to the forming head for positioning the device within the container.

22. In a device for spreading material to form a crust in a container having a bottom wall and a peripheral side wall: a supporting framework engageable with the container comprising a pair of spaced apart arm for extending generally diametrically of the container and an arcuately extending arm connected to ends of the diametrically extending arms engageable with the upper portion of the container side wall and cooperating therewith to constrain the device for rotation about the center of the container, and a forming head mounted on the framework having a bottom wall and a side wall with arc lengths less than 360° facing the corresponding walls of the container and a wall extending between and adjacent to the bottom and side walls of the forming head to provide a surface contiguous with the bottom and side walls for spreading material to form a crust in the container upon rotation of the device.

23. The crust forming device of claim 22 wherein the forming head is removably mounted on the diametrically extending arms of the framework.

24. The crust forming device of claim 22 wherein the forming head includes a pair of generally radially extending walls extending between the lateral margins of the side wall and the bottom wall of the forming head.

25. The crust forming device of claim 24 further including mounting means carried by the radially extending walls of the forming head for engaging the diametrically extending arms of the framework to secure the forming head to the framework.

26. The crust forming device of claim 22 further including a radially extending wiper carried by the forming head for engaging the upper portion of the container side wall to prevent undesired accumulation of crust material thereon.

27. The crust forming device of claim 22 wherein the upper portion of the container side wall comprises a laterally extending annular rim and a generally cylindrical upstanding flange, and the arcuately extending arms of the forming device are adapted to engage the upper surface of the rim and the inner surface of the flange.

28. The crust forming device of claim 22 wherein separate arcuately extending arms interconnect the ends of the diametrically extending arms on different sides of the container.

29. The crust forming device of claim 28 wherein the arcuately extending arms are offset downwardly of the diametrically extending arms.

30. The crust forming device of claim 22 wherein the diametrically extending arms are formed to include U-shaped portions toward the ends thereof.

31. The crust forming device of claim 30 wherein the U-shaped portions extend upwardly and the diametrically extending arms are further formed to include downwardly extending U-shaped portions adjacent to the upwardly extending U-shaped portions and having one leg in common therewith.

32. In a device for spreading material to form a crust in a container having a bottom wall and a peripheral side wall: a forming head having a bottom wall, a side wall and a wall extending between the bottom and side walls of the forming head to provide a radially extending surface for spreading crust material upon rotation of the forming head about the center of the container; support structure engageable with the container and having means to constrain the support structure against rotation relative to the container; and means rotatively mounting the forming head to the support structure for rotation about the center of the container with the bottom and side walls of the forming head facing the corresponding walls of the container.

33. The crust forming device of claim 32 wherein the means mounting the forming head includes a bearing mounted on the support structure and a drive shaft rotatively journaled in the bearing, the forming head being constrained for rotation with the drive shaft.

34. In a device for spreading material to form a crust in a container having a bottom wall and a peripheral side wall: a forming head having a bottom wall, a side wall having an arc length of less than 360° and a wall extending between the bottom and side walls of the forming head to provide a surface for spreading crust material upon rotation of the forming head about the center of the container; support structure engageable with the container and having means to constrain the support structure against rotation relative to the container; and means rotatively mounting the forming head to the support structure for rotation about the center of the container with the bottom and side walls of the forming head facing the corresponding walls of the container.

* * * * *